Figure 1:
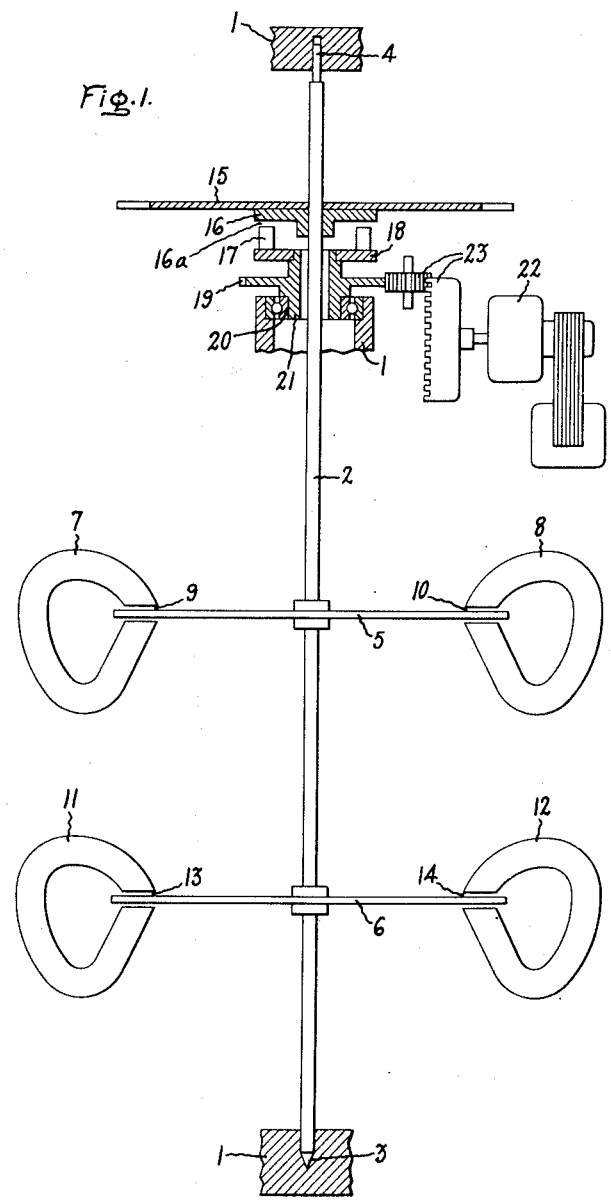

Oct. 24, 1950

H. G. WILCOX, JR
TEMPERATURE COMPENSATION FOR
HYSTERESIS CLUTCH DRIVE

Filed Nov. 30, 1949

2,527,237

2 Sheets-Sheet 1

Inventor:
Hayden G. Wilcox, Jr.,
by Russell A. Warner
His Attorney.

Oct. 24, 1950

H. G. WILCOX, JR
TEMPERATURE COMPENSATION FOR
HYSTERESIS CLUTCH DRIVE 2,527,237

Filed Nov. 30, 1949

Inventor:
Hayden G. Wilcox, Jr.,
by Russell A. Warner
His Attorney.

Patented Oct. 24, 1950

2,527,237

UNITED STATES PATENT OFFICE 2,527,237

TEMPERATURE COMPENSATION FOR HYSTERESIS CLUTCH DRIVES

Hayden G. Wilcox, Jr., Schenectady, N. Y., assignor to General Electric Company, a corporation of New York Application November 30, 1949, Serial No. 130,297

3 Claims. (Cl. 172—284)

This invention relates to a temperature compensating structure for a hysteresis clutch drive. It is especially adapted for use in connection with watt-hour meter variable frequency type telemetering systems in which a hysteresis clutch drive is used to supply a constant torque to the watt-hour meter shaft.

In the operation of a watt-hour meter variable frequency type telemetering system, the frequency of a transmitted signal is made to vary in response to the magnitude of a measurable quantity over a range in the order of 6 to 27 cycles per second. The variable frequency is obtained by mounting a serrated disk on the same shaft with the induction disks of the watt-hour meter in such manner that the serrated periphery of the disk breaks a light beam in the order of 35 to 40 times per revolution. The intermittent beam is detected photoelectrically and the amplified signal is transmitted to the receiving equipment. Since very low frequencies cannot be transmitted satisfactorily, a minimum frequency of, for example, 6 cycles per second, is used to designate zero power measurement. The speed of the shaft necessary to maintain this minimum frequency is obtained by supplying a constant torque to the shaft through a hysteresis clutch which is driven by an electric motor. When no power is being measured by the watt-hour meter this constant torque maintains the speed of the serrated disk at what will be termed the minimum frequency speed. When power is being measured an additional torque is supplied to the shaft which increases the speed of the shaft and the frequency of the transmitted signal in direct proportion to the power being measured by the meter.

In the detailed description of the watt-hour meter telemetering system contained in this specification it will be seen that temperature variations cause a marked change in the magnitude of both the constant torque supplied by the hysteresis clutch and the torque exerted on the induction disks, thereby causing a corresponding change or error in the transmitted frequency of the telemetering system.

It is, therefore, the object of my invention to provide a structural arrangement in which the temperature-induced changes in the magnitude of the constant torque supplied by the hysteresis clutch and the temperature-induced changes in the magnitude of the torque exerted on induction disks are mutually compensatory.

The magnitude of the constant torque exerted by the hysteresis clutch is a function of the length of the air gap between a hysteresis clutch disk, which is affixed to the aforementioned serrated disk, and a permanent magnet structure rotatably mounted in close proximity with the composite disk structure. It is the feature of my invention to utilize the temperature-induced change in length of the watt-hour meter shaft to change the length of this air gap thereby compensating for any temperature-induced change in the torque supplied to the meter shaft by the induction disks. It is pointed out, however, that complete compensation may be had only for specific temperatures, since the temperature-torque characteristics of the induction disks and the temperature-torque characteristics of the hysteresis clutch are not necessarily identical functional relationships.

Figure 2:
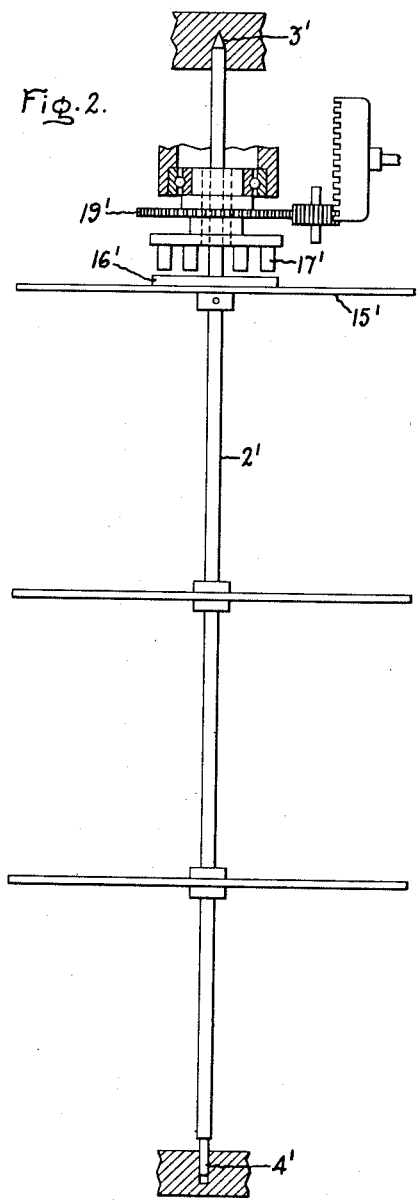

The features of this invention which I believe to be novel and patentable are pointed out in the claims forming a part of this specification. For a better understanding of the invention, reference is made in the following description to the accompanying drawing, in which Fig. 1 is an assembled view in elevation of the rotating shaft portion of a watt-hour meter telemetering apparatus including a hysteresis clutch drive mounted on the meter shaft in accordance with my invention. Fig. 2 is a modification of the telemetering apparatus shown in Fig. 1.

Referring particularly to Fig. 1 of the drawing, there is shown the rotating shaft portion of a watt-hour meter telemetering apparatus including a frame 1 which supports an operating shaft 2 preferably composed of a relatively lightweight material, such as, for example, aluminum, and mounted for rotation in a vertical axis by a lower pivot bearing 3 and an upper guide bearing 4. Attached to shaft 2 are two current-conducting disks 5, 6 of a polyphase watt-hour meter which cooperate with the usual alternating current field producing elements (not shown) to produce a rotation of the shaft 2 in accordance with the measured quantity. As is well understood, an alternating current watt-hour meter driving element includes two alternating current magnets, one excited by the current and the other by the potential of the circuit in which the power is to be measured, each of which induces phase-displaced eddy currents in the meter disk. The disk is driven or caused to rotate by the reaction between the field of one magnet and the current induced in the disk by the other magnet of the same driving element. A pair of usual damping magnets 7, 8 having air gaps 9, 10 formed between their poles and adapted to receive disk 5, are provided for setting up a magnetic field to oppose the rotation of the disk 5 in order to make its speed proportional to the power consumption measured by the meter. Similarly, damping magnets 11, 12 having air gaps 13, 14 cooperate with disk 6 to comprise a second driving element which produces a further increase in the speed of shaft 2 proportional to the power measured by the second measuring element of the polyphase watt-hour meter. In this connection, I desire to point out that while I have illustrated a polyphase watt-hour meter, I may likewise employ a watt-hour meter of single phase construction in connection with my invention.

Located near the upper end of shaft 2 and mounted thereon is a disk 15, the periphery of which is serrated to interrupt a light beam (not shown) when being rotated. Attached to serrated disk 15 and forming a part thereof is a hysteresis clutch disk 16 of high coercive force magnetic material, preferably of the copper-nickel-cobalt type. A magnetic field-producing structure comprising a plurality of bar magnets 17 is mounted directly beneath hysteresis clutch disk 16 on a base member 18 attached to a driving gear 19. Driving gear 19 is mounted concentrically with shaft 2 in a bearing 20 which is shaped to receive a sleeve extension 21 of gear 19. Gear 19 and permanent magnet structure 17, 18 are free to rotate about shaft 2 and are driven by a motor 22 which cooperates with gear 19 through a gear train 23. Bar magnets 17 are arranged in such manner that the upper extremities thereof form a circular pattern of magnetic poles having alternate north and south polarities. Hysteresis clutch disk 16 is positioned above this circular pattern of magnetic poles so as to provide a relatively good path for the flux of magnets 17. This produces a high flow of flux through hysteresis clutch disk 16 and thus produces a good hysteresis torque when the magnetic field-producing means is rotated with respect to hysteresis clutch disk 16. As is well known to those skilled in the art, the torque supplied by a hysteresis clutch drive is proportional to the area of what is generally termed the hysteresis characteristic of the torque-producing material, which in this case is hysteresis clutch disk 16. The area of the hysteresis characteristic or the area defined by a plot of the magnetizing force versus flux density is dependent on the air gap 16a between the magnetizing force or permanent magnets 17 and the magnetic material or hysteresis clutch disk 16. It therefore follows that the torque of the hysteresis clutch is a function of the length of the air gap 16a and that a change in the length of air gap 16a causes a change in the magnitude of the torque exerted on shaft 2 by the hysteresis clutch.

In the structure shown in Fig. 1, hysteresis clutch disk 16 is affixed to shaft 2 while the magnetic-field producing structure is mounted to the frame 1 by bearing 20. Hence an increase in temperature causes disk 16 to move away from the magnetic field-producing structure 17, 18 as a result of the elongation of shaft 2 between disk 16 and bearing 3. The increase in air gap 16a effectively decreases the hysteresis driving torque exerted on disk 16 and compensates for a corresponding decrease in eddy current drag torque exerted on disks 5, 6 by magnets 7, 8 and 11, 12 respectively. Such reduced drag torque results from decreased conductivity of disks 5, 6 due to a temperature increase thereof.

Since the total elongation is a function of the length of the shaft 2 and its coefficient of expansion, it will be obvious that the desired degree of compensation may be obtained by varying the effective length of shaft 2 or the composition thereof. One such variation is shown in Fig. 2 in which shaft 2' is supported at its upper end by a pivot bearing 3' and at its lower end by a guide bearing 4'. The magnetic field-producing means which includes a plurality of bar magnets 17' is suspended from gear 19' and is located above hysteresis clutch disk 16' and serrated disk 15'. The magnetic force between disk 16' and magnets 17' forces shaft 2' upwards against bearing 3'. The effect of such construction is to decrease the length the portion of shaft 2' which is effective in changing the length of air gap 16a due to temperature changes. This portion of shaft 2' lies between magnets 17' and bearing 3' and is relatively shorter than the corresponding portion between magnets 17 and bearing 3 in Fig. 1.

In operation disk 15, which is serrated on its circumference, breaks a light beam in the order of 35 to 40 times per revolution. The interrupted beam is picked up by photoelectric apparatus (not shown) and the amplified signal is transmitted to the receiving apparatus. The signal has a frequency proportional to the rate of which the watt-hour meter shaft rotates. For operating conditions, a minimum frequency of the order of 6 cycles per second is required, even when no power is being measured by the meter. This minimum frequency speed is supplied by the hysteresis clutch drive in which magnetic field-producing structure 17, 18 is driven by an external driving source, such as motor 22, through a gear train 23. In the watt-hour meter itself, the moving elements usually take the form of a shaft and a pair of induction disks, usually of aluminum, in which torque-producing eddy currents are induced. The speed at which the disks rotate is directly proportional to the power which is measured by the meter and the number of revolutions made by the disks in a period of time is a direct measure of the energy consumed during that period of time. By providing the constant torque of the hysteresis clutch, a predetermined minimum frequency speed of the meter shaft is maintained even when the driving torque exerted on the induction disks by a measured load is zero. Any increase in eddy current torque resulting from increased power consumption increases the shaft speed and consequently the frequency of interruption of the light beam by serrated disk 15. Any decrease in eddy current drag torque resulting from increase in temperature is compensated by a corresponding decrease in the constant driving torque of the hysteresis clutch. Similarly, any increase in eddy current drag torque resulting from a decrease in temperature is compensated by an increase in the constant driving torque of the hysteresis clutch.

While I have shown and described my invention as applied to particular watt-hour meter telemetering apparatus, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a temperature compensating structure for a hysteresis clutch drive comprising a shaft member mounted for rotation about a first axis, first and second means for guiding the rotation of said shaft member, said first guide means being constructed and arranged to allow substantially unrestricted axial expansion and contraction of said shaft member in response to changes in temperature thereof and said second guide means being constructed and arranged to restrain one extremity of said shaft member, a first disk of high coercive force material secured to said shaft member for rotation therewith, a second disk of current-conducting material secured to said shaft member for rotation therewith, permanent magnet damping means for controlling the rotation of said second disk, a rotatable permanent magnet assembly adjacent said first disk and including a plurality of permanent magnets arranged in spaced relationship with respect to each other, said magnets having their magnetic axes substantially parallel to said first axis and adjacent poles thereof opposite in polarity, said assembly being mounted concentrically with said shaft member to permit relative rotational motion therebetween, said assembly being located between said first disk and said second guide means so that the length of the air gap between said first disk and said permanent magnet assembly is varied by expansion or contraction of said shaft member in response to changes in temperature thereof, and driving means connected to said assembly for imparting rotational motion thereto.

2. In combination, a temperature compensating structure for a hysteresis clutch drive comprising a shaft member mounted for rotation about an axis, first and second means for guiding the rotation of said shaft member, said first guide means being constructed and arranged to allow substantially unrestricted axial expansion and contraction of said shaft member in response to changes in temperature thereof and said second guide means being constructed and arranged to restrain one extremity of said shaft member, a first disk of high coercive force material secured to said shaft member for rotation therewith, a second disk of current-conducting material secured to said shaft member for rotation therewith, permanent magnet damping means for controlling the rotation of said second disk, rotatable magnetic field-producing means concentrically mounted with respect to said shaft member to permit relative rotational motion therebetween, said magnetic field-producing means being positioned between said first disk and said second guide means so that the air gap between said first disk and said field-producing means is varied by expansion or contraction of said shaft member in response to changes in temperature thereof, and driving means for imparting rotational motion to said magnetic field-producing means.

3. In combination, a temperature compensating structure for a hysteresis clutch drive comprising a shaft member mounted for rotation about an axis, first and second means for guiding the rotation of said shaft member, said first guide means being constructed and arranged to allow substantially unrestricted axial expansion and contraction of said shaft member in response to changes in temperature thereof and said second guide means being constructed and arranged to restrain one extremity of said shaft member, a first disk of high coercive force material secured to said shaft member for rotation therewith, a second disk of current-conducting material secured to said shaft member for rotation therewith, permanent magnet damping means cooperative with said second disk to impose a drag torque thereon to oppose rotation thereof, said drag torque being variable in response to changes in the temperature of said second disk, magnetic field-producing means rotatably mounted relative to said shaft member, said magnetic field producing means being positioned between said first disk and said second guide means so that the air gap between said first disk and said field-producing means is varied by expansion or contraction of said shaft member in response to changes in temperature thereof, and driving means for imparting rotational motion to said magnetic field-producing means, a hysteretic driving torque responsive to said air gap being imposed on said first disk by said last-mentioned rotational motion, variations in said driving and drag torques in response to said temperature changes being in the same direction.

HAYDEN G. WILCOX, Jr.

REFERENCES CITED

The following references are of record in the file of this patent:

UNITED STATES PATENTS

| Number | Name | Date |
|---|---|---|
| 1,887,284 | Brady | Nov. 8, 1932 |
| 2,183,404 | Morrill | Dec. 12, 1939 |
| 2,361,239 | Ransom | Oct. 24, 1944 |
| 2,373,609 | Stahl | Apr. 10, 1945 |
| 2,386,505 | Puchy | Oct. 9, 1945 |